(12) United States Patent
Trujillo (10) Patent No.: US 10,936,779 B2
(45) Date of Patent: *Mar. 2, 2021

(54) SYSTEM AND METHOD FOR OBFUSCATION OF ELECTRONIC CIRCUITS

(71) Applicant: Honeywell Federal Manufacturing & Technologies, LLC, Kansas City, MO (US)

(72) Inventor: Joshua Trujillo, Kansas City, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 80 days.

This patent is subject to a terminal disclaimer.

(21) Appl. No.: 16/402,504

(22) Filed: May 3, 2019

(65) Prior Publication Data

US 2019/0258769 A1 Aug. 22, 2019

Related U.S. Application Data

(63) Continuation of application No. 15/680,446, filed on Aug. 18, 2017, now Pat. No. 10,331,839.

(51) Int. Cl.
*G06F 30/39* (2020.01)
*G06F 30/392* (2020.01)
*G06F 30/394* (2020.01)
*G06F 30/398* (2020.01)

(52) U.S. Cl.
CPC .......... *G06F 30/392* (2020.01); *G06F 30/394* (2020.01); *G06F 30/398* (2020.01)

(58) Field of Classification Search
CPC .... G06F 30/392; G06F 30/394; G06F 30/398; G06F 17/5072; G06F 17/5077; G06F 17/5081
USPC ........................................ 716/100, 126, 137
See application file for complete search history.

(56) References Cited

U.S. PATENT DOCUMENTS

| | | | | |
|---|---|---|---|---|
| 5,563,084 A | * | 10/1996 | Ramm et al. ....... | H01L 21/6835 148/DIG. 135 |
| 6,100,178 A | * | 8/2000 | Todd et al. .......... | H05K 1/0284 205/126 |
| 6,501,025 B2 | * | 12/2002 | Tilli et al. .............. | F02M 37/10 123/516 |
| 6,541,847 B1 | * | 4/2003 | Hofstee et al. ..... | H01L 23/3735 257/686 |

(Continued)

*Primary Examiner* — Sun J Lin
(74) *Attorney, Agent, or Firm* — Hovey Williams LLP (57) ABSTRACT

A computer-implemented method of generating randomized electrical interconnects for an electronic circuit comprises steps of receiving a netlist of nodes of electronic components to be connected, each connection between the nodes forming an electrical interconnect; determining a list of one or more path directions for each electrical interconnect; determining a plurality of path direction distances for each electrical interconnect; generating a plurality of segments for each electrical interconnect, each segment having one path direction and a length which are selected at random; calculating a sum of the lengths of all of the segments in each path direction each time a segment is generated for each electrical interconnect; removing one path direction from the list of path directions when a first condition is met; and stopping the generating a plurality of segments for each electrical interconnect when a second condition is met.

7 Claims, 8 Drawing Sheets

(56) References Cited

U.S. PATENT DOCUMENTS

| | | | |
|---|---|---|---|
| 6,668,325 B1 * | 12/2003 | Collberg et al. | G06F 21/14 |
| | | | 713/194 |
| 7,555,736 B2 * | 6/2009 | Cadouri | G06F 30/39 |
| | | | 716/106 |
| 9,208,277 B1 * | 12/2015 | Lamant | G06F 30/392 |
| 9,258,907 B2 * | 2/2016 | Gonya et al. | H05K 1/09 |
| 9,298,878 B2 * | 3/2016 | Guirguis et al. | G06F 21/6254 |
| 10,331,839 B2 * | 6/2019 | Trujillo | G06F 30/394 |

* cited by examiner

SYSTEM AND METHOD FOR OBFUSCATION OF ELECTRONIC CIRCUITS

RELATED APPLICATION

The current patent application is a continuation patent application which claims priority benefit, with regard to all common subject matter, to U.S. patent application Ser. No. 15/680,446, entitled "SYSTEM AND METHOD FOR OBFUSCATION OF ELECTRONIC CIRCUITS", and filed Aug. 18, 2017. The earlier-filed patent application is hereby incorporated by reference in its entirety into the current application.

STATEMENT REGARDING FEDERALLY-SPONSORED RESEARCH OR DEVELOPMENT

This invention was made with Government support under Contract No.: DE-NA0002839 awarded by the United States Department of Energy/National Nuclear Security Administration. The Government has certain rights in the invention.

BACKGROUND OF THE INVENTION

Field of the Invention

Embodiments of the current invention relate to systems and methods of obfuscating electronic circuitry to prevent or reduce reverse engineering.

Description of the Related Art

An electronic circuit may include a plurality of connected passive and/or active electronic components that, when receiving electric voltage and/or electric current, perform a function. The function may range from simple, such as converting an alternating current (AC) voltage to a direct current (DC) voltage or determining the time of day, to complex, rendering imagery or performing calculations to predict the weather. The level of complexity may be related to the number of components included in the circuit, which may range from tens of components to tens of millions of components. Electronic circuits may be implemented in packaged integrated circuits or on printed circuit boards, among other options. A packaged integrated circuit may include a die with electronic components, such as transistors and other devices, formed in a substrate, such as silicon or germanium. After the electronic components are formed or placed, they are electrically connected using electrically conductive traces, wherein each trace connects one node, or terminal, to another node. Each trace includes a plurality of segments formed from one or more planar layers of electrical conductors which are positioned on top of the substrate. A layer of electrical insulator separates the electrical conductors from the substrate. A plurality of insulator layers separates the layers of conductors from one another, with one insulator layer positioned between adjacent conductor layers. Typically, each trace has the shortest length possible through the conductor layers. Once all the components are connected, the die is placed and sealed in a package of plastic, ceramic, or similar material.

Electronic components implemented on a printed circuit board may include packaged integrated circuits as well as discrete components placed on a top surface and/or a bottom surface of the board. As with the packaged integrated circuit, electrically conductive traces may connect nodes from one component to nodes on another component. Each trace includes segments formed from electrical conductors positioned on the top and bottom surfaces and on one or more planar layers positioned therebetween. The printed circuit board material is an electrical insulator and separates the layers of conductors in a similar fashion to the packaged integrated circuit.

Other implementations of electronic circuits, such as high or low temperature cofired ceramic (HTCC or LTCC), multichip modules (MCM), or the like, also utilize layers of electrical conductors separated by layers of insulators to provide electrical connection of circuit components.

Normally, electronic circuits are obscured by the package of an integrated circuit or the solid material of the printed circuit board so that the circuits cannot be seen and potentially understood. However, it is possible to remove the package of an integrated circuit and grind, polish, or plane the top surface of the die to remove the electrical conductors, layer by layer, noting the pattern of the conductors at each layer. Likewise, electronic components may be removed, by desoldering, for example, from a printed circuit board, and the board may be cut or ground from the top or bottom surface or from an edge to reveal the pattern of the inner conductive layers. Careful deconstruction of the conductive layers of an integrated circuit or printed circuit board may lead to reverse engineering of the underlying electronic circuits and theft of intellectual property.

SUMMARY OF THE INVENTION

Embodiments of the current invention provide methods of generating randomized electrical interconnects for an electronic circuit which obfuscate the interconnects from easily being reverse engineered. One embodiment of the method may comprise the steps of creating a three-dimensional grid that fits a space of a printed circuit board; receiving a netlist of nodes of electronic components to be connected, each connection of nodes forming an electrical interconnect with a start node and an end node; determining a list of one or more path directions for each electrical interconnect; determining a plurality of path direction distances for each electrical interconnect; generating a plurality of segments for each electrical interconnect, each segment having one path direction and a length which are selected at random; calculating a sum of the lengths of all of the segments in each path direction each time a segment is generated for each electrical interconnect; removing one path direction from the list of path directions when the sum of the lengths of the segments in that path direction is equal to the path direction distance for each electrical interconnect; and stopping the generation of the segments when a sum of the lengths of all of the segments in each path direction is equal to each path direction distance for each electrical interconnect.

Another embodiment of the method may comprise the steps of creating a three-dimensional grid that fits a space of an electronic circuit medium; receiving a netlist of nodes of electronic components to be connected, each connection of nodes forming an electrical interconnect with a start node and an end node; choosing an initial Z-value for the start node at random for each electrical interconnect; determining a list of one or more path directions for each electrical interconnect; determining a plurality of path direction distances for each electrical interconnect; generating a plurality of segments for each electrical interconnect, each segment having one path direction and a length which are selected at random; calculating a sum of the lengths of all of the segments in each path direction each time a segment is generated for each electrical interconnect; removing one path direction from the list of path directions when the sum of the lengths of the segments in that path direction is equal to the path direction distance for each electrical interconnect; and stopping the generation of the segments when a sum of the lengths of all of the segments in each path direction is equal to each path direction distance for each electrical interconnect.

Yet another embodiment of the method may comprise the steps of receiving a netlist of nodes of electronic components to be connected, each connection of nodes forming an electrical interconnect with a start node and an end node; selecting a geometric shape or mathematical function at random to determine a path for each electrical interconnect; and select an interconnect length at random for each electrical interconnect.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein.

The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
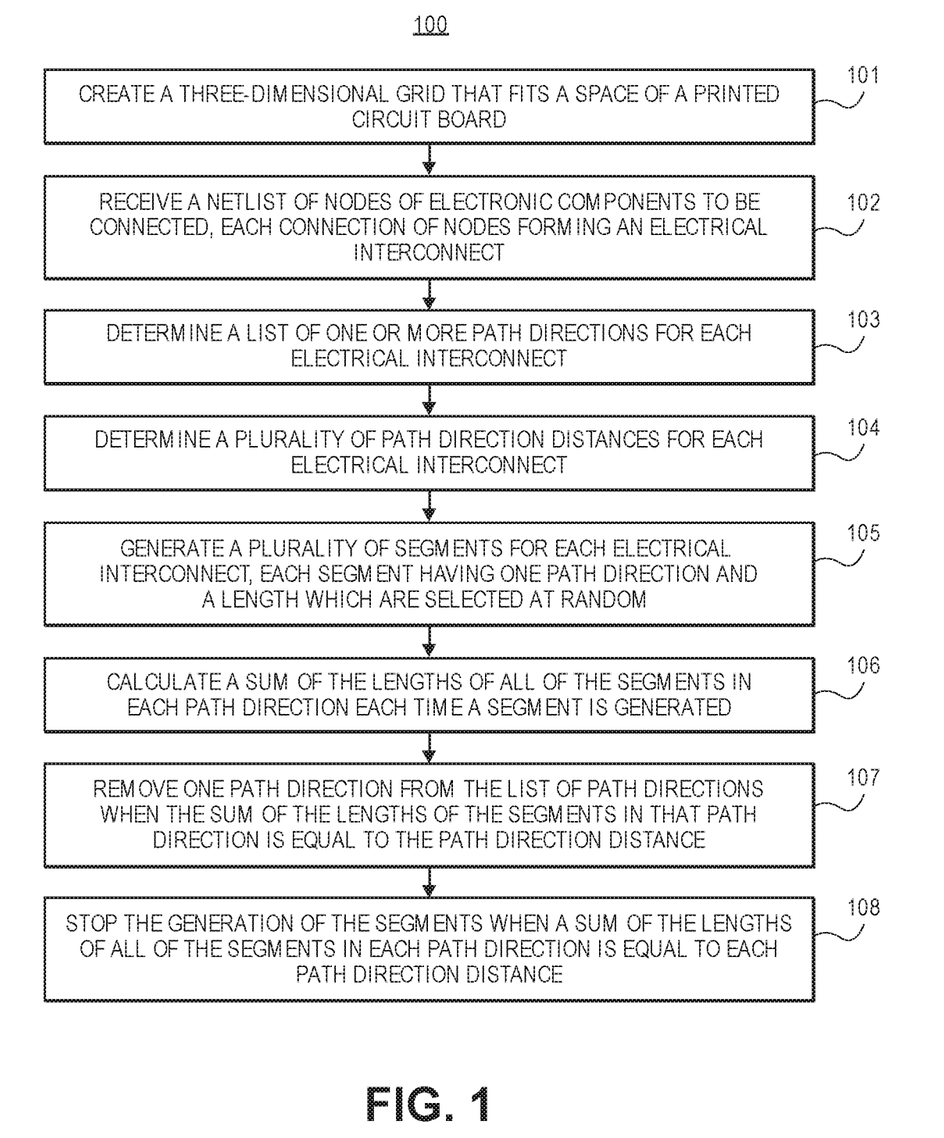
FIG. 1 is a listing of at least a portion of steps of an embodiment of a method generating randomized electrical interconnects for an electronic circuit.
Figure 2:
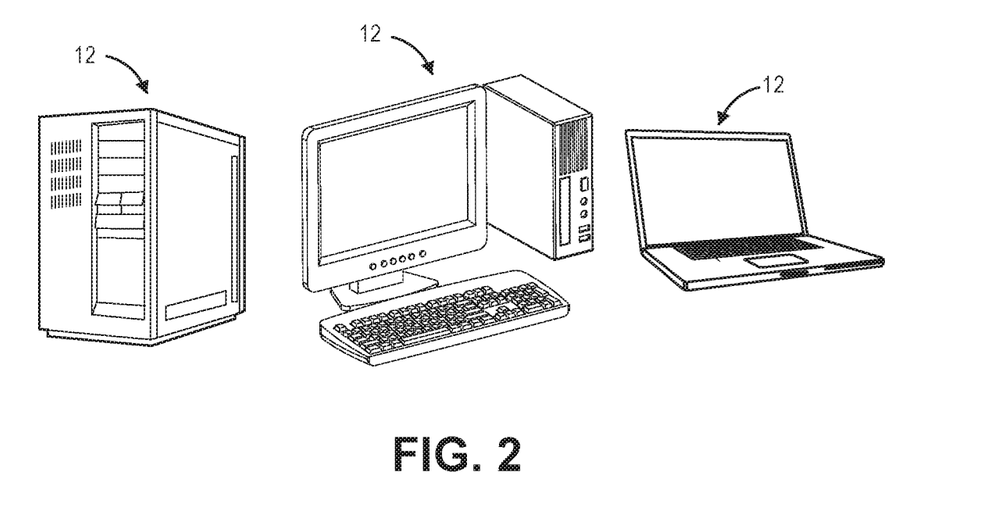
FIG. 2 is a perspective view of various embodiments of a computing device configured to perform the steps of the method.
Figure 3:
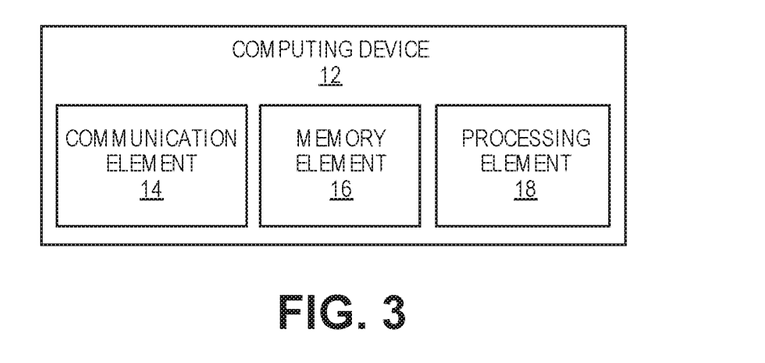
FIG. 3 is a schematic block diagram of various components of the computing device.

At least a portion of the steps of a method 100 of generating randomized electrical interconnects 10 for an electronic circuit is shown in FIG. 1. The method 100 may be implemented or executed by a computer or computing device 12, such as a server, a workstation computer, a desktop computer, a laptop computer, a palmtop computer, a tablet computer, or the like, as shown in FIG. 2. The computing device 12 may broadly comprise, inter alia, a communication element 14, a memory element 16, and a processing element 18, as seen in FIG. 3. The computing device 12 may implement the method 100 utilizing hardware, firmware, software, or combinations thereof.

The communication element 14 generally allows communication with external systems or devices. The communication element 14 may include signal and/or data transmitting and receiving circuits, such as antennas, amplifiers, filters, mixers, oscillators, digital signal processors (DSPs), and the like. The communication element 14 may establish communication wirelessly by utilizing radio frequency (RF) signals and/or data that comply with communication standards such as cellular 2G, 3G, 4G, or 5G, Institute of Electrical and Electronics Engineers (IEEE) 802.11 standard such as WiFi, IEEE 802.16 standard such as WiMAX, Bluetooth™, or combinations thereof. Alternatively, or in addition, the communication element 14 may establish communication through connectors or couplers that receive metal conductor wires or cables which are compatible with networking technologies such as ethernet. In certain embodiments, the communication element 14 may also couple with optical fiber cables. The communication element 14 may be in communication with the memory element 16 and the processing element 18.

The memory element 16 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 16 may be embedded in, or packaged in the same package as, the processing element 18. The memory element 16 may include, or may constitute, a "computer-readable medium". The memory element 16 may store the instructions, code, code segments, software, firmware, programs, applications, apps, services, daemons, or the like that are executed by the processing element 18. The memory element 16 may also store settings, data, documents, sound files, photographs, movies, images, databases, and the like.

The processing element 18 may include electronic hardware components such as processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 18 may generally execute, process, or run instructions, code, code segments, software, firmware, programs, applications, apps, processes, services, daemons, or the like. The processing element 18 may also include hardware components such as finite-state machines, sequential and combinational logic, and other electronic circuits that can perform the functions necessary for the operation of the current invention. The processing element 18 may be in communication with the other electronic components through serial or parallel links that include universal busses, address busses, data busses, control lines, and the like.

The method 100 may be utilized to generate randomized electrical interconnects 10 for a printed circuit board 20 that includes top and bottom surfaces on which electronic components 22 may be placed and electrically conductive traces may be routed. The printed circuit board 20 may also include a plurality of inner electrically conductive layers on which traces may be routed. The traces may be formed from metals or metal alloys. The electronic components 22 may include packaged integrated circuits, discrete active or passive components, switches, pushbuttons, lights, connectors, or the like, or combinations thereof. The electronic components 22 may be through-hole, surface-mount, or both. Furthermore, each electronic component 22 includes at least one node 24 which connects to one or more traces. Each electrical interconnect 10 may include data which defines the shape and position of one trace on the printed circuit board 20. The data of the electrical interconnect 10 may be utilized by machinery or equipment to fabricate the printed circuit board 20.

Figure 4:
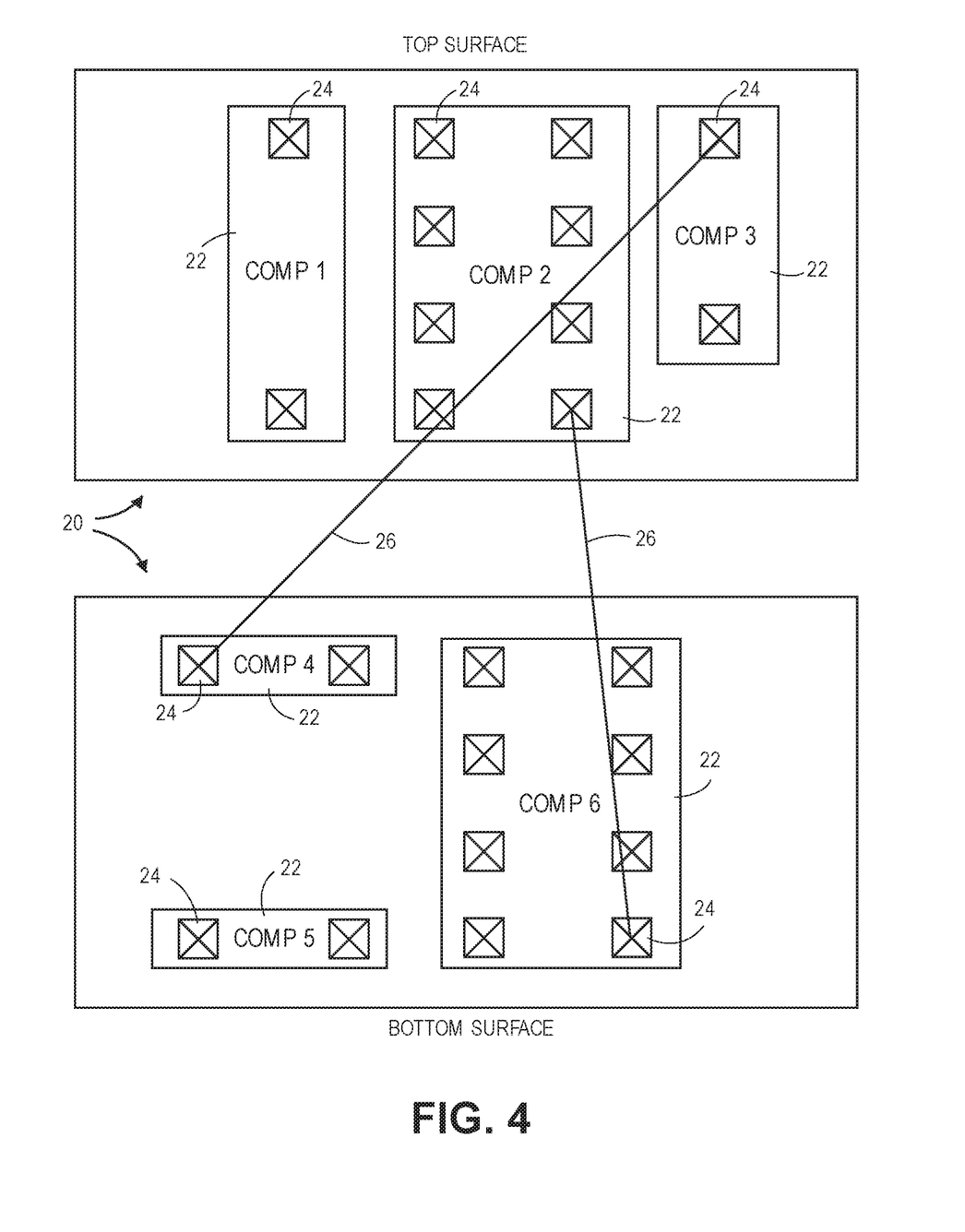
FIG. 4 is a schematic block diagram of various electronic components positioned on a top surface and a bottom surface of a printed circuit board.

A schematic representation of the printed circuit board 20 is illustrated in FIG. 4, wherein outlines of the top and bottom surfaces are shown. Also shown are outlines of a plurality of exemplary electronic components 22 which are placed in their final locations. Each outline of an electronic component 22 also includes indications of nodes 24 of the component 22. In addition, two exemplary schematic connections 26, connecting a node 24 of one component 22 to a node 24 of another component 22 are shown in "rats nest" form. The electrical interconnects 10 are derived from the schematic connections 26, which may be generated from a schematic diagram of the electronic circuit which is to be implemented on the printed circuit board 20.

The method 100 may be integrated with an electronic CAD design flow and assumes that all of the electronic components 22 have been placed, or at least that the coordinates of each node 24 of each component 22 are known. Some electrical interconnects 10 may not be routed using the method 100. In addition, the method 100 may be best used on electrical interconnects 10 that connect an electronic component 22 on the top surface of the printed circuit board 20 to an electronic component 22 on the bottom surface or vice versa. The steps of the method 100 may be performed in the order shown in FIG. 1, or they may be performed in a different order. Furthermore, some steps may be performed concurrently as opposed to sequentially. In addition, some steps may be optional or may not be performed.

Figure 5:
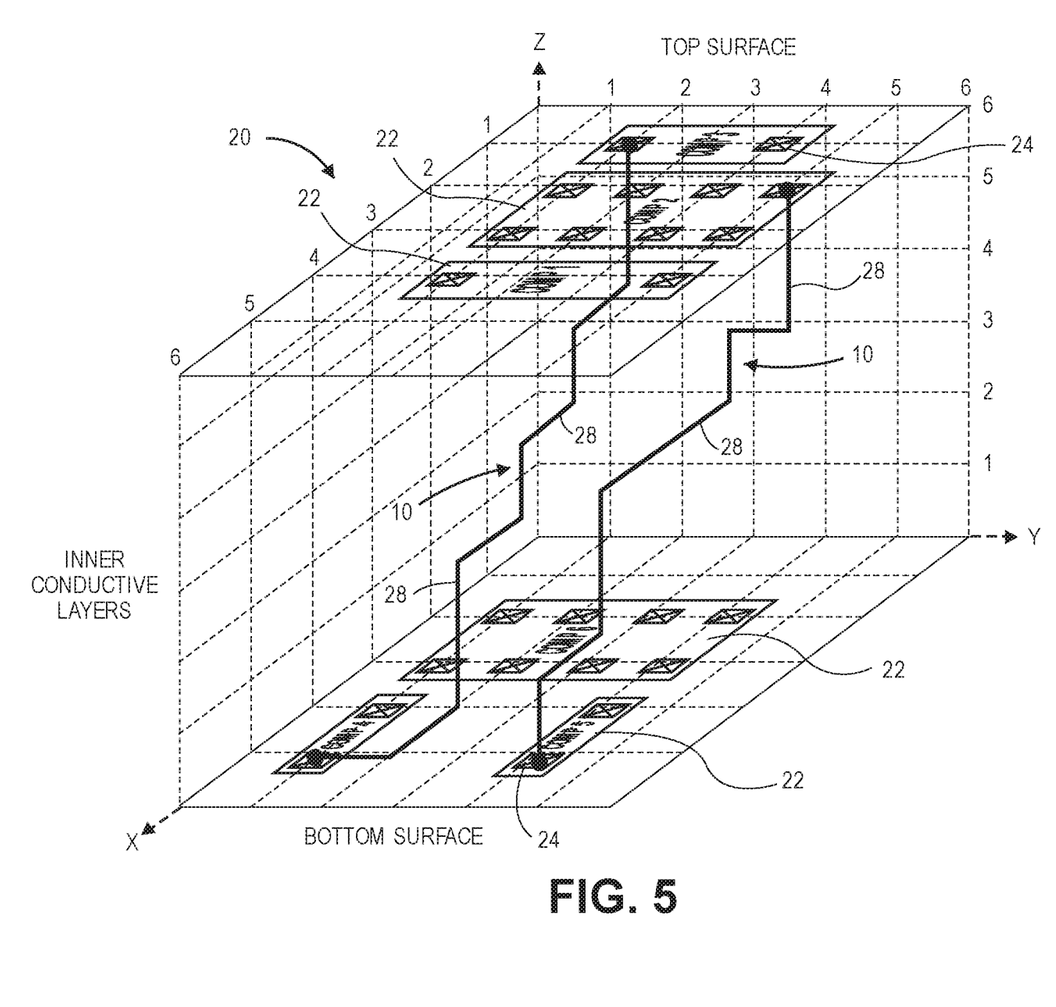
FIG. 5 is a perspective view of the top surface, the bottom surface, and a plurality of inner conductive layers of the printed circuit board further illustrating randomized electrical interconnects.

Referring to step 101, a three-dimensional grid, such as an XYZ coordinate space, may be created to fit the space of the printed circuit board 20. The grid may oriented such that the bottom surface, the top surface, and the inner conductive layers are all positioned on XY planes with boundaries of the grid set by the edges of the printed circuit board 20, as shown in FIG. 5. As an example, the bottom surface may be positioned on the XY plane at Z=0, the top surface may be positioned at Z=6, and the inner conductive layers may be positioned at Z=1-5. The XY coordinates may be based on actual distances, such as in millimeters or inches. Alternatively, the XY coordinates may be based on units related to design rules for printed circuit board fabrication, such as minimum feature size, minimum pitch between drilled holes, minimum pitch between adjacently routed interconnects, etc. The origin for the grid may be located at one of the corners of the bottom surface of the printed circuit board 20.

Referring to step 102, a netlist of nodes 24 of electronic components 22 to be connected is received. The netlist may include a plurality of electrical interconnects 10 to be generated, wherein each electrical interconnect 10 may be defined, in part, by coordinates of a start node 24 and coordinates of an end node 24. The nodes 24 may be located on whole number grid points.

Referring to step 103, for each electrical interconnect 10, a list of one or more path directions from the start node 24 to the end node 24 is determined, wherein the path directions may be selected from −X, +X, −Y, +Y, −Z, and +Z. The path directions may be determined by subtracting a value at each dimension coordinate of the start node 24 from a value at each dimension coordinate of the end node 24 and keeping the sign of the resulting values in each dimension. For example, if the start node 24 is at (5, 4, 0) on the bottom surface and the end node 24 is at (2, 5, 6) on the top surface, such as with the electrical interconnect 10 shown on the right in FIG. 5, then the path directions would be −X, +Y, and +Z. It is noted that the electrical interconnect 10 itself is not directional, and the start node 24 and the end node 24 could be swapped. Nevertheless, in order to route the electrical interconnect 10, one node 24 is selected as the start and one node 24 is selected as the end.

Referring to step 104, for each electrical interconnect 10, a plurality of path direction distances, each representing a total distance in one of the path directions from the start node 24 to the end node 24 is determined. Each path direction distance may be determined by subtracting a value at each dimension coordinate of the start node 24 from a value at each dimension coordinate of the end node 24 and taking an absolute value of each dimension coordinate. Following the example above, the path direction distance would be (3, 1, 6).

Referring to step 105, for each electrical interconnect 10, a plurality of segments 28 is generated, with a first segment 28 starting at the start node 24, each subsequent segment 28 starting at an end of the previous segment 28, and a last segment 28 ending at the end node 24. Each segment 28 may be oriented in one of the path directions selected at random. Each segment 28 may have a length selected at random and being less than or equal to the path direction distance. The random selection may be implemented using a random number generator or by adding noise to a non-randomized interconnect path.

Referring to step 106, a sum of the lengths of all the segments 28 in each path direction is calculated each time a segment 28 is generated.

Referring to step 107, one path direction is removed from the list of path directions when the sum of the lengths of the segments 28 in that path direction is equal to the path direction distance.

Referring to step 108, the generation of the segments 28 is stopped when a sum of the lengths of all the segments 28 in each path direction is equal to the path direction distance. Before each segment 28 is incorporated with, or added to, the electrical interconnect 10, the selected path direction and distance may be verified not to violate design rules and not to intersect other electrical interconnects 10 or electronic components 22. If there is a conflict with the current path direction and length of the segment 28, then a new path direction and/or distance may be randomly selected. Two electrical interconnects 10 created using the method 100 are shown in FIG. 5. The first electrical interconnect 10 has a start node 24 at (5, 1, 0) and an end node 24 at (1, 2, 6). The second electrical interconnect 10, mentioned in the example above, has a start node 24 at (5, 4, 0) and an end node 24 at (2, 5, 6).

Figure 6:
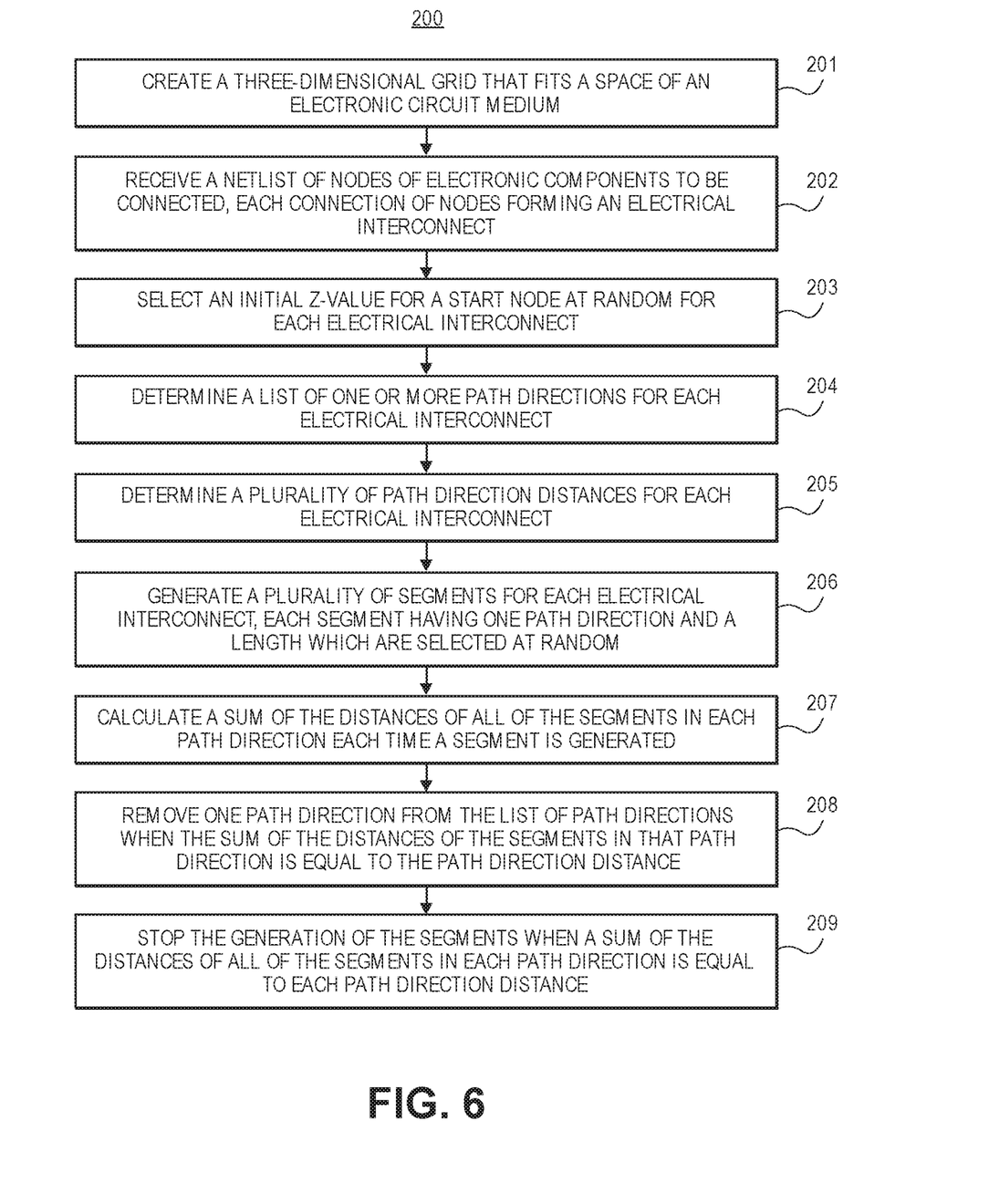
FIG. 6 is a listing of at least a portion of steps of another embodiment of a method generating randomized electrical interconnects for an electronic circuit.

At least a portion of the steps of a method 200 of generating randomized electrical interconnects 210 for an electronic circuit is shown in FIG. 6. The method 200 may have the same function or result as the method 100 discussed above and may be implemented using the computing device 12 through hardware, firmware, and/or software, but may be utilized in situations in which a start node 224 and an end node 224 of an electrical interconnect 210 lie in the same Z-axis plane of an electronic circuit medium, such as may be the case with start nodes 224 and end nodes 224 that are both positioned on either the top surface or the bottom surface of the printed circuit board 20. The method 200 may also be utilized in routing of the electrical interconnects 210 for electronic components 222 of an integrated circuit, all of which are typically located on the same Z-axis plane—otherwise known as a substrate 230. The substrate 230 of the integrated circuit may include regions that are doped and include traces of semiconducting material, such as polysilicon, to form electronic components 222, each of which includes a plurality of nodes 224. The electrical interconnects 210 to connect the nodes 224 may be formed from a plurality of layers of electrically conductive materials, such as metals, which are deposited, interposed with layers of electrical insulators, on the substrate 230.

Figure 7:
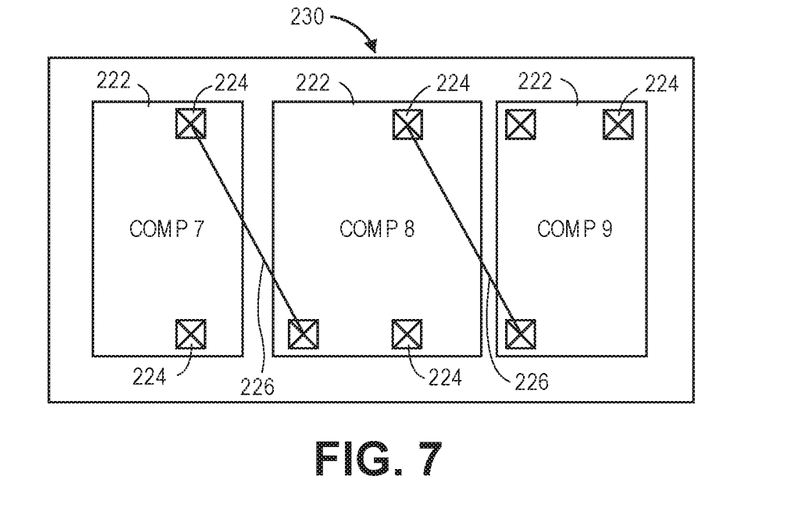
FIG. 7 is a schematic block diagram of various electronic components positioned on an electronic circuit medium.

FIG. 7 illustrates an example of a small portion of substrate 230 with three electronic components 222, with a footprint of each including node 224 locations shown in outline. (The substrate 230 may be much larger than what is shown and is capable of retaining thousands or even millions of electronic components 222.) Also illustrated are two schematic connections 226, shown in rats nest form, from which the electrical interconnects 210 are derived.

As with the method 100, the method 200 may be integrated with an electronic CAD design flow and assumes that all of the electronic components 222 have been placed, or at least that the coordinates of each node 224 of each component 222 are known. Some electrical interconnects 210 may not be routed using the method 200. The steps of the method 200 may be performed in the order shown in FIG. 6, or they may be performed in a different order. Furthermore, some steps may be performed concurrently as opposed to sequentially. In addition, some steps may be optional or may not be performed.

Figure 8:
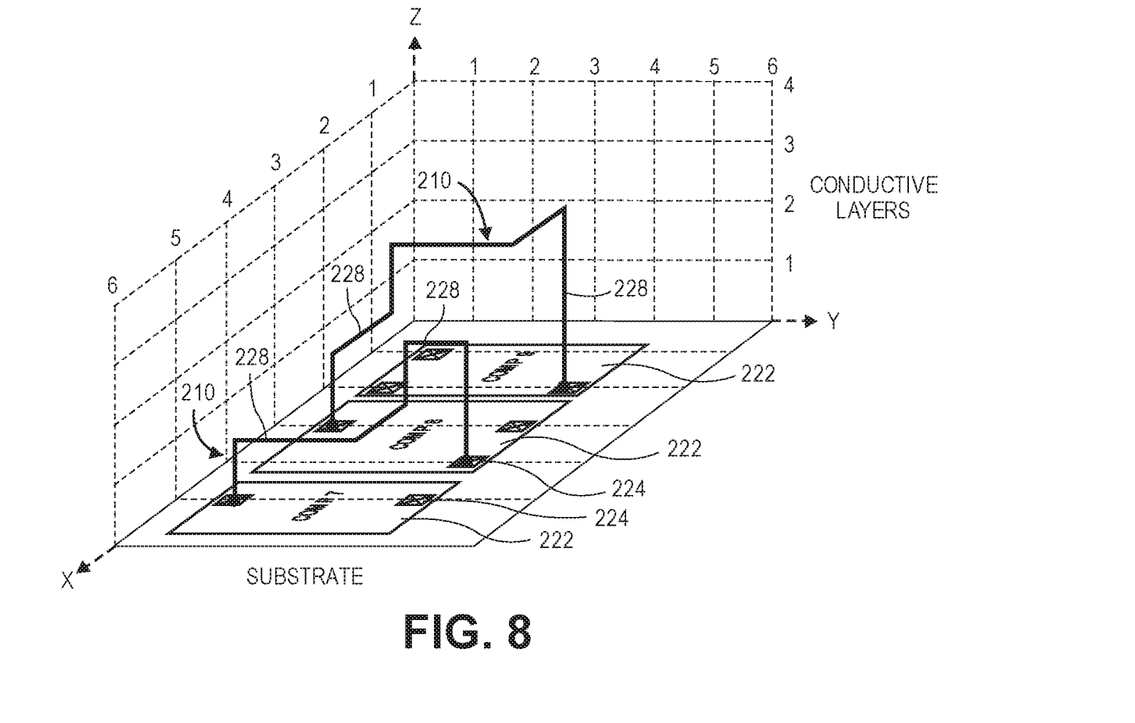
FIG. 8 is a perspective view of a substrate and a plurality of conductive layers of the electronic circuit medium further illustrating randomized electrical interconnects.

Referring to step 201, a three-dimensional grid, such as an XYZ coordinate space, may be created to fit the space of an electronic circuit medium, such as the printed circuit board 20 or the substrate 230. The grid may oriented such that the origin is located at, or near, a corner of the substrate 230 with the XY plane at Z=0 is aligned with the first layer of conductive material, sometimes known as "metal 1", as is shown in FIG. 8. Additional conductive layers are shown at Z=1-4. The XY coordinates may be based on actual distances, such as in millimeters or inches. Alternatively, the XY coordinates may be based on units related to design rules for integrated circuit fabrication, such as minimum feature size, minimum pitch between adjacently routed interconnects, etc.

Referring to step 202, a netlist of nodes 224 of electronic components 222 to be connected is received. The netlist may include a plurality of electrical interconnects 210 to be generated, wherein each electrical interconnect 210 may be defined, in part, by coordinates of a start node 224 and coordinates of an end node 224. In some embodiments, the netlist may also include a maximum interconnect length value for each electrical interconnect 210. The maximum interconnect length value may be specified in order to control the electrical resistance and/or capacitance, which in turn, may have an effect on propagation delays of electronic signals traveling over the electrical interconnects 210.

Referring to step 203, for each electrical interconnect 210, an initial Z-value for the start node 224 is selected at random. The Z-value may be selected from a range of 1 to a maximum number of electrically conductive layers −1. In the exemplary substrate 230 shown in FIG. 8, the maximum number of conductive layers is 5, so the range of the Z-value may be 1 to 4. The Z-value may also be selected such that the total length of the electrical interconnect 210 is less than or equal to the maximum interconnect length value specified in the netlist. The Z-value generally provides additional routing in the vertical, or Z-axis, direction that may increase obfuscation of the electrical interconnect 210.

Referring to step 204, for each electrical interconnect 210, a list of one or more path directions from the start node 224 to the end node 224 is determined. The path directions in the XY plane may be selected from −X, +X, −Y, and +Y and may be determined by subtracting the X and Y values of the start node 224 from the X and Y values of the end node 224 and keeping the sign of each difference. However, since the initial Z-value is selected as a positive value, the path direction along the Z-axis is always −Z. For example, if the start node 224 is at (2, 4) and the end node 224 is at (3, 1), such as with the upper electrical interconnect 210 shown in FIG. 8, then the path directions would be +X, −Y, and −Z.

Referring to step 205, for each electrical interconnect 210, a plurality of path direction distances, each representing a total distance in one of the path directions from the start node 224 to the end node 224 is determined. The path direction distance may be determined by subtracting a value at each dimension coordinate of the start node 224 from a value at each dimension coordinate of the end node 224 and taking an absolute value of each dimension coordinate. Since the start node 224 and the end node 224 are in the same XY plane, the path direction distance may be determined by subtracting the two X values and the two Y values and taking the absolute value of each difference. The path direction distance for the Z-axis is the Z-value selected in an earlier step. Following the example above, the XY path direction distance may be (1, 3). If the Z-value is selected at random to be 3, then the total path direction distance may be (1, 3, 3).

Referring to step 206, for each electrical interconnect 210, a plurality of segments 228 is generated, with the first segment 228 starting at the start point, each subsequent segment 228 starting at an end of the previous segment 228, and the last segment 228 ending at the end point. Each segment 228 may be oriented in one of the path directions selected at random. Each segment 228 may have a length selected at random and being less than or equal to the path direction distance. The random selection may be implemented using a random number generator or by adding noise to a non-randomized interconnect path.

Referring to step 207, a sum of the lengths of all the segments 228 in each path direction is calculated each time a segment 228 is generated.

Referring to step 208, one path direction is removed from the list of path directions when the sum of the lengths of the segments 228 in that path direction is equal to the path direction distance.

Referring to step 209, the generation of the segments 228 is stopped when a sum of the lengths of all the segments 228 in each path direction is equal to the path direction distance. Before each segment 228 is incorporated with, or added to, the electrical interconnect 210, the selected path direction and length may be verified not to violate design rules and not to intersect other electrical interconnects 210 or electronic components 222. If there is a conflict with the current path direction and length of the segment 228, then a new path direction and/or length may be randomly selected. Two electrical interconnects 210 created using the method 200 are shown in FIG. 8. The first electrical interconnect 210 has a start node 224 at (4, 4) with a Z-value of 2 and an end node 224 at (5, 1). The second electrical interconnect 210, mentioned in the example above, has a start node 224 at (2, 4) with a Z-value of 3 and an end node 224 at (3, 1).

Figure 9:
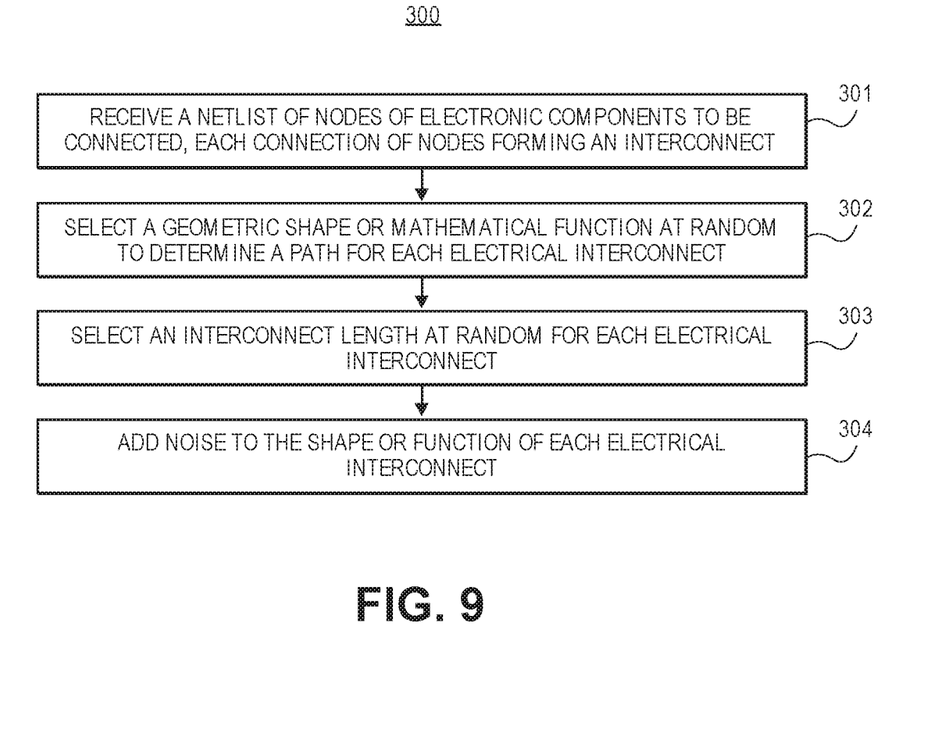
FIG. 9 is a listing of at least a portion of steps of yet another embodiment of a method generating randomized electrical interconnects for an electronic circuit.

At least a portion of the steps of a method 300 of generating randomized electrical interconnects 310 for an electronic circuit is shown in FIG. 9. The method 300 may have the same function or result as the methods 100, 200 discussed above and may be implemented using the computing device 12 through hardware, firmware, and/or software, but may be utilized with electronic circuit technologies that take advantage of additive manufacturing techniques, such as 3-D printing, to generate at least the electrical interconnects 310. These technologies may include an integrated circuit type in which electronic components are formed on a substrate and the electrical interconnects 310 are formed on top of the substrate or formed separately and then bonded to the substrate. The technologies may also include a printed circuit board type in which the printed circuit board may be created using additive manufacturing. The steps of the method 300 may be performed in the order shown in FIG. 9, or they may be performed in a different order. Furthermore, some steps may be performed concurrently as opposed to sequentially. In addition, some steps may be optional or may not be performed.

Referring to step 301, a netlist of nodes 324 of electronic components 322 to be connected is received. The netlist may include a plurality of electrical interconnects 310 to be generated, wherein each electrical interconnect 310 may be defined, in part, by coordinates of a start node 324 and coordinates of an end node 324. The netlist may also include a maximum interconnect length value for each electrical interconnect 310. The maximum interconnect length value may be specified in order to control the electrical resistance, capacitance, and/or inductance of the electrical interconnect 310, which in turn, may have an effect on propagation delays of electronic signals traveling over the electrical interconnect 310. A maximum propagation delay may be specified by an electronic circuit designer, which in turn, determines the interconnect value.

Figure 10:
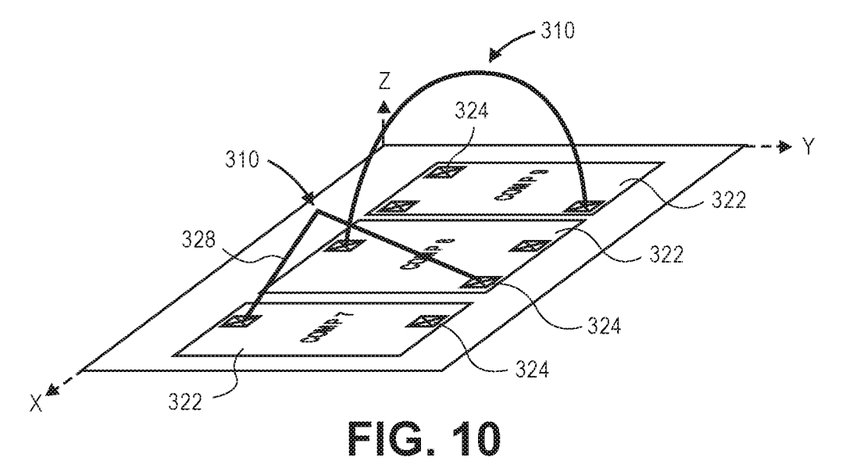
FIG. 10 is a perspective view of a substrate with randomized electrical interconnects formed using additive manufacturing techniques.

Referring to step 302, for each electrical interconnect 310, a geometric shape or a mathematical function is selected at random to determine a path of the electrical interconnect 310. The geometric shape and the mathematical function may be selected from a finite number of shapes and functions, respectively. The geometric shape may include a plurality of connected segments 328 that form a portion of a polygon, such as a triangle, a rectangle, a hexagon, an octagon, etc., wherein the segments 328 are not oriented along the lines of an orthogonal three-dimensional grid, such as an XYZ coordinate space. For example, a first electrical interconnect 310 shown in the lower half of FIG. 10 includes two segments 328 that may form a portion of a triangle. The segments 328 do not necessarily align with the X, Y, or Z axes. The geometric shape may also include one or more segments 328 that have a curvature, such as an arch, semi-circular, semi-oval, semi-elliptical, or so forth shape. For example, a second electrical interconnect 310 shown in the upper half of FIG. 10 may have an arch or semi-oval shape. A first endpoint of the shape may contact the start node 324, and a second endpoint of the shape may contact the end node 324. The mathematical function may be embodied by functions such as polynomials (particularly, higher order polynomials), sinusoidals, exponentials, and the like, wherein the start and end nodes 324 may be points included in the mathematical function.

Referring to step 303, for each electrical interconnect 310, an interconnect length is selected at random. The interconnect length may have an intrinsic minimum value based on the actual distance from the start node 324 to the end node 324 and design rules for routing electrical interconnects 310, among other parameters. And the netlist may specify a maximum interconnect length value. The interconnect length may be selected at random to have a value that is greater than the minimum length and less than or equal to the maximum length. If the electrical interconnect 310 has multiple segments 328, then a length for each segment 328 may be selected at random, with a sum of the lengths of the segments 328 being greater than the minimum length and less than or equal to the maximum length. With the shape and the length having been selected, the electrical interconnect 310 may be defined and stored as a plurality of coordinates, each coordinate set indicating an endpoint of each segment 328. Alternatively, the electrical interconnect 310 may defined and stored as a plurality of sampled points of a curve or other shape. In addition, and if appropriate, the mathematical function or equation defining the electrical interconnect 310 may be stored.

Figure 11:
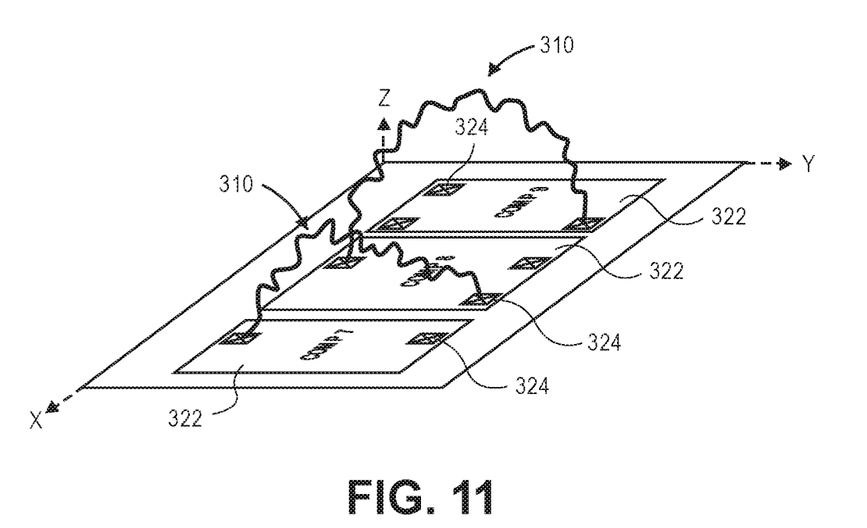
FIG. 11 is a perspective view of a substrate with randomized electrical interconnects that include added noise and that are formed using additive manufacturing techniques.

Referring to step 304, for each electrical interconnect 310, noise is optionally added to the shape or function of the electrical interconnect 310. The type, bandwidth, and distribution, among other parameters, of the noise may vary. As an example, additive white Gaussian noise may applied to the electrical interconnect 310. FIG. 11 shows examples of noise being added or applied to the electrical interconnects 310 of FIG. 10, which modifies the shape thereof. Noise may be added to each segment of the geometric shape or may be added as a term in the function or equation that determines the path of the electrical interconnect 310. The electrical interconnect 310 may defined and stored as a plurality of sampled points of the shape. The definitions, or data, for each electrical interconnect 310 may be communicated to an additive manufacturing machine, such as a 3D printer, which will fabricate at least the electrical interconnect portion of the electronic circuit.

Adding or applying noise may further obfuscate the electrical interconnects 310 from a competitor or bad actor attempting to reverse engineer the associated electronic circuit. Typically, when reversing engineering an electronic circuit, an operator will remove horizontal planes or layers, parallel to the substrate, of electrical interconnect and insulator material—working from an upper surface or layer down to the substrate. With noise-modified electrical interconnects 310, at each plane or layer that is exposed, any one electrical interconnect 310 may cross the plane multiple times—making one electrical interconnect 310 appear to be multiple interconnects, thus confusing the competitor.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computer-implemented method of generating randomized electrical interconnects for an electronic circuit, the method comprising the following steps, wherein each step is performed by a processor of a computer:

receiving a netlist of nodes of electronic components to be connected, each connection between the nodes forming an electrical interconnect with a start node and an end node;

selecting a geometric shape or a mathematical function at random to determine a path for each electrical interconnect; and selecting an interconnect length at random for each electrical interconnect.

2. The computer-implemented method of claim 1, further comprising a step of adding noise to the geometric shape or the mathematical function of each electrical interconnect.

3. The computer-implemented method of claim 2, wherein the noise includes an additive white Gaussian noise.

4. The computer-implemented method of claim 1, wherein the geometric shape includes a plurality of connected segments such that a first segment starts at the start node of the first segment, each subsequent segment starts at an end of a segment immediately previous to said each subsequent segment, and a last segment ends at the end node of the last segment.

5. The computer-implemented method of claim 4, wherein the plurality of segments do not align with orthogonal X, Y, and Z axes.

6. The computer-implemented method of claim 1, wherein the geometric shape includes a single segment with a curvature shape or a rounded shape.

7. The computer-implemented method of claim 1, wherein the interconnect length of said each electrical interconnect is selected at random from a range that is greater than a minimum value determined by a distance between the start node and the end node of said each electrical interconnect and that is less than or equal to a maximum value determined by a maximum propagation delay for said each electrical interconnect.

\* \* \* \* \*